Nov. 25, 1930.  D. E. KEECH  1,782,826
FRUIT DISTRIBUTOR
Filed Oct. 1, 1929   2 Sheets-Sheet 1
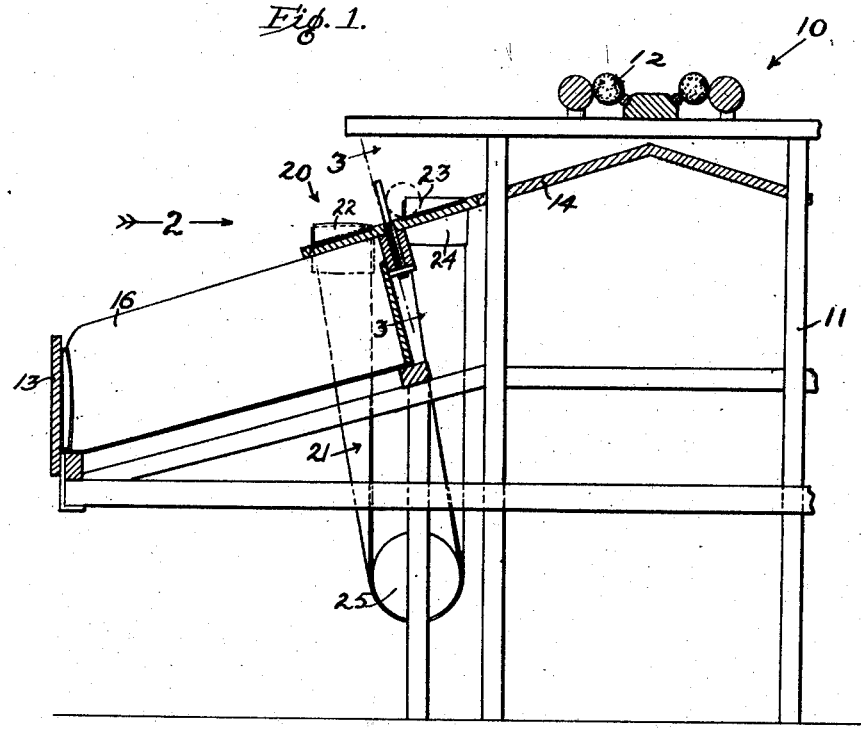
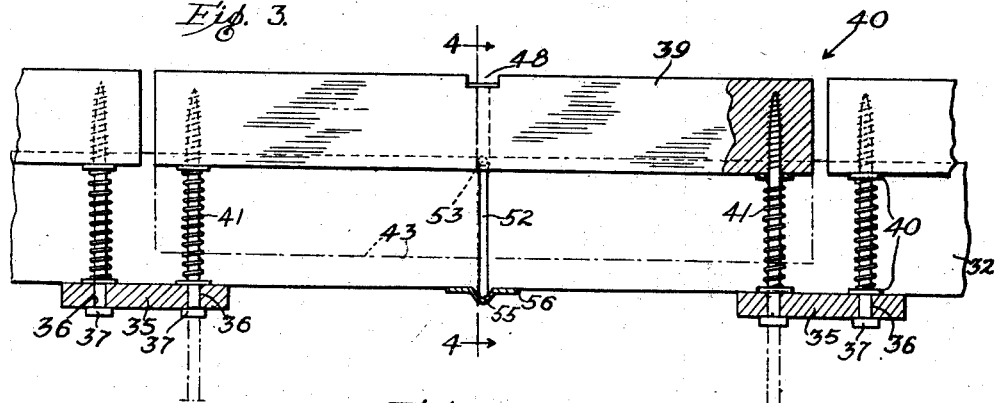
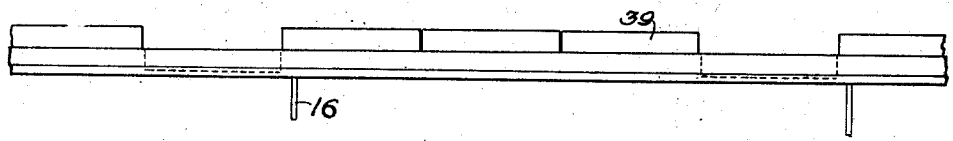
Inventor:
David E. Keech Nov. 25, 1930.   D. E. KEECH   1,782,826
FRUIT DISTRIBUTOR
Filed Oct. 1, 1929   2 Sheets-Sheet 2

Inventor:
David E. Keech

Patented Nov. 25, 1930

1,782,826

UNITED STATES PATENT OFFICE

DANA E. KEECH, OF GLENDALE, CALIFORNIA

FRUIT DISTRIBUTOR

Application filed October 1, 1929. Serial No. 396,459.

My invention relates to conveying devices and more particularly to fruit distributing devices such as are used on fruit sizers.

The fruit sizers in most general use, as, for instance, in the citrus industry, includes a sizing runway on which fruit is carried and from different fixed points along the length of which fruit is discharged according to size. Beneath this sizing runway and outwardly therefrom are provided bins for holding the sized fruit while it is being wrapped and packed by hand packers. These bins usually are coextensive in length with the sizer and are divided into sections of variable length by partitions which are freely shiftable lengthwise in the bins.

Each of the fractions into which the fruit is divided according to size, is directed into one of these bin sections. The proportionate quantity of these fractions varies greatly from time to time and frequently over half the fruit will run to one size. Under such a condition the bin section for receiving this fraction will be quite long. This presents the problem of distributing the fruit discharged at a fixed location on the sizing runway to all parts of this long bin section. Distributing devices of various kinds are used for this purpose.

One such device in common use includes a pair of belts traveling in opposite directions along the upper surface of an inclined bed which extends laterally from beneath the sizing runway to a point over the adjacent bin. Between these belts is provided a low wall which is adjustable lengthwise to vary the location of an opening therein. One such opening is provided opposite each bin section and fruit discharged at an adjacent sizing outlet of the sizing runway rolls down the aforesaid bed onto the upper belt and, lying against said low wall, is carried along with this belt until it reaches said wall opening whereupon it rolls by gravity through the opening and across the lower inclined belt into the bin section therebelow. The lower belt is known as a "blockade puller" and its function is to carry fruit along and drop it into an empty portion of a bin section when that portion opposite the adjacent low wall opening fills with fruit.

Much difficulty is experienced in using the distributing device outlined above on account of the longitudinal adjustability of the low wall between the two distributing belts. This wall usually has pins which slide in a narrow groove in the inclined belt bed. The wall portions therefore, are generally removed when not in use and have to be laid around somewhere. This results in their getting lost or at least being troublesome to keep in their right place. When additional wall is needed at some point along the sizer it is generally wanted in a hurry and the inconvenience of having to hunt for the necessary piece of wall is very annoying.

It is accordingly an object of my invention to provide a fruit sizer distributing device of the general character noted in which the wall is not detachable from the sizer.

It is a further object of my invention to provide in such a device a wall all portions of which remain in the same position longitudinally but which are vertically adjustable, for purposes of forming suitable outlets therein for fruit carried by such device.

Another object is to provide in such a device, a novel mechanism for controlling the vertical position of various portions of the wall thereof.

The manner of accomplishing the foregoing objects, as well as further objects and advantages will be made manifest in the following description and in the accompanying drawings, in which:

Fig. 1 is a diagrammatic fragmentary cross sectional view of a type of fruit sizer in common use and illustrating the incorporation of a preferred embodiment of my invention therewith.

Fig. 2 is a fragmentary side elevational view taken in the direction of the arrow 2 in Fig. 1.

Fig. 3 is an enlarged fragmentary sectional view taken on the line 3—3 of Fig. 1.

Figure 7:
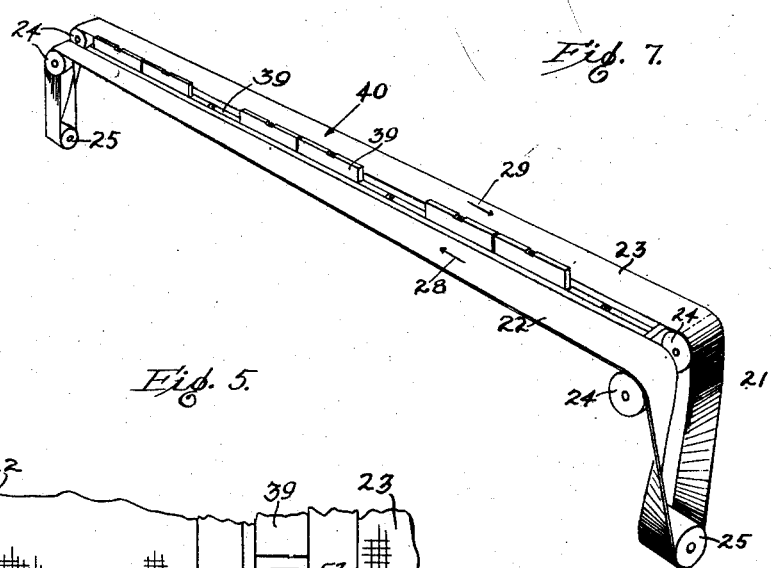
Fig. 7 is a perspective view illustrating the fruit distributing device of my invention.
Figure 5:
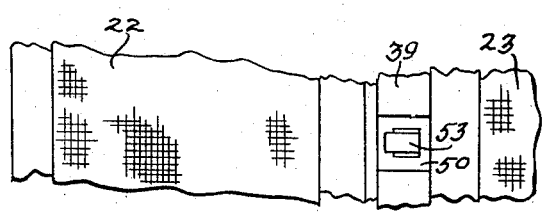
Figs. 5 and 6 are fragmentary top and bottom plan views of Fig. 4.

Referring specifically to the drawings, Fig. 1 shows a sizer 10 having a frame 11. There is provided on top of this frame, a sizing mechanism 12, and laterally to one side thereof a bin 13. Between this mechanism and the bin 13 is an inclined base member 14 down which fruit discharged from the sizing mechanism may roll into the bin. The bin 13 may be divided lengthwise as by longitudinally shiftable partitions 16.

Mounted upon the lower portion of the inclined base 14 is the fruit distributing device 20 of my invention. The distributing device 20 includes an endless belt 21, flights 22 and 23 of which lie in suitable, shallow channels provided in the upper face of the inclined base 14. Opposite ends of the flights 22 and 23 extend over idler pulleys 24, the end loops of the belt 21 passing around pulleys 25, one of which is rotated by a suitable source of power whereby the flights 22 and 23 are moved respectively in the directions of the arrows 28 and 29 in Fig. 7.

Figure 4:
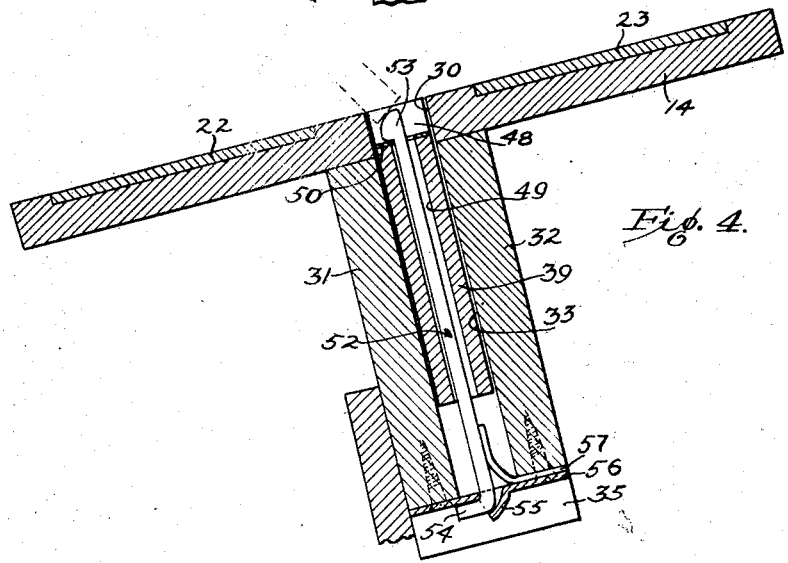
Fig. 4 is an enlarged vertical sectional view taken on the line 4—4 of Fig. 3.
Figure 6:
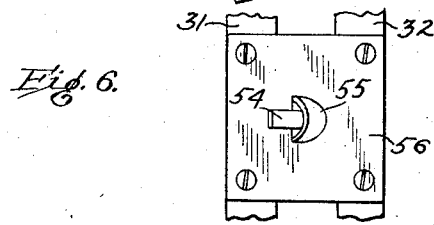

Provided in the base 14 midway between adjacent edges of the flights 22 and 23 is an opening 30 extending the full length of these belts. Disposed downwardly from the base 14 alongside the opening 30 are members 31 and 32 which extend the confined space of the opening 30 downwardly to form a wall receiving pocket 33. Secured to lower faces of the members 31 and 32 at spaced intervals are cross pieces 35. Each of the cross pieces 35 has a spaced pair of vertical apertures 36 formed therein. Extending upwardly through the apertures 36 are lag screws 37, these lag screws screwing into the bodies of wall sections 39 of a fruit retaining wall 40. Disposed about each lag screw 37 between the wall section 39 into which it screws and the cross piece 35 through which it extends is a pair of washers 40 which are spaced by a compression spring 41. The springs 41 for each section 39 retain this section in its upwardmost position in which such a section is shown in full lines in Fig. 3. Each of these sections is adapted to be depressed by manually forcing it downward against the action of the springs 41 until this section reaches the position indicated by broken lines 43 in Fig. 3. Means for retaining such section in depressed position 43 is provided as follows:

Each wall section 39 has a notch 48 formed centrally in its upper edge, there being a hole 49 extending downwardly from this notch 48 through the body of that section 39. The lower surface of the notch 48 is protected by an inlay 50 formed of metal or other hard material. Extending into the hole 49 is a latch member 52 having an offset head 53 at its upper end and a bent lower end portion 54. The bent lower end 54 of the latch member 52 extends into a socket 55 formed in a latch mounting plate 56 which is secured against the lower faces of the members 31 and 32 midway between the adjacent cross pieces 35. Clamped between the member 32 and the plate 56 is a leaf spring 57 which bears against the latch member 52 as shown in Fig. 4. When any of the sections 39 is depressed downwardly as shown in Fig. 4, the latch head 53 is urged into locking relation with an edge portion of the hole 49 as soon as this head extends above the inlay 50. Thereupon this wall section 39 is latched in its lower position and will remain there until the latch head 53 is disengaged by pushing this rightward from the position in which it is shown in Fig. 4.

The operation of my invention is as follows:

When sizing is commenced on the sizer 10 the belt 21 is set in motion as previously described and the bin partitions 16 are shifted in the bin 13 so as to divide this into bin sections for receiving the different fractions into which the fruit is divided according to size so that each bin section will correspond in size to the proportion of all of the fruit which the fraction delivered by the sizer to that bin section comprises.

In practical use the wall 40 is generally comprised of at least twice as many sections 39 as this wall is shown as having in Fig. 7. The function of the wall 40 is to provide a series of barriers along the lower edge of the belt flight 23 so that fruit discharged at several points from the sizing mechanism 12 rolls downwardly across the inclined base 14 onto the belt flight 23 and is retained thereon so as to be carried in the direction of the arrow 29 by the adjacent extended portion of the wall 40. The fruit is thus carried along on the belt flight 23 until it comes opposite the next depressed wall section 39 whereupon it rolls through the opening thereby created in the wall 40 and across the belt flight 22 into the bin 13.

The choice of location of these openings in the wall 40 is accomplished by releasing the latch heads 53 of all of the depressed wall sections 39 and then depressing those wall sections 39 which are nearest to the head end of each of the bin sections into which it is desired to run the fruit. The result is diagrammatically shown in the perspective view in Fig. 7. As the fruit fills up that portion of each bin section adjacent the outlet in the wall 40 through which fruit is being discharged into that bin section, the fruit piles up onto the lower belt flight 22 and is carried thereby in the direction of the arrow 28 and discharged farther along into the same bin section, this resulting eventually in filling the entire bin section uniformly with fruit. Because it thus prevents the wall openings being blockaded with fruit the belt flight 22 has received the name of "blockade puller" in the fruit industry.

As may be readily seen the fruit distributing device of my invention has many advantages, particularly as the sections 39 of the wall 40 are never in danger of being lost and may be very easily controlled so as to provide passageways in the wall 40 at whatever points it may be desired to discharge fruit from the upper flight 23 of the belt 21.

While I have shown and described but a single embodiment of my invention it is understood that various modifications may be made in this embodiment without departing from the spirit of the invention or the scope of the appended claims.

What I claim is:

1. In a fruit sizer, the combination of: means for sizing fruit; a bin for receiving the sized fruit; a laterally inclined belt running longitudinally between said sizing means and said bin; a wall disposed alongside a lower edge of said inclined belt, said wall being divided into sections; means upon which said sections are mounted which prevents longitudinal movement of said sections and permits vertical movement thereof so that individual sections may be disposed out of contact with fruit carried on said belt; and means for temporarily retaining said individual sections in such inactive positions.

2. In a fruit sizer, the combination of: means for sizing fruit; a bin for receiving the sized fruit; a laterally inclined base over which sized fruit is adapted to roll from said sizing means into said bin; an endless conveyer extending along said base and adapted to convey fruit longitudinally when said fruit is held in contact therewith; a wall for engaging said sized fruit so as to retain it in contact with said conveyer, said wall being divided into sections; and means permitting certain of said sections to be shifted vertically into positions in which they do not so engage said fruit, and holding said sections in such positions.

3. In a fruit sizer, the combination of: means for sizing fruit; a bin for receiving the sized fruit; a laterally inclined base over which sized fruit is adapted to roll from said sizing means into said bin; an endless conveyer extending along said base and adapted to convey fruit longitudinally when said fruit is held in contact therewith; a wall for engaging said sized fruit so as to retain it in contact with said conveyer, said wall being divided into sections; and means for mounting certain of said sections to permit depression thereof to provide passageways through said wall.

4. A combination as in claim 3 having means for yieldably urging said adjustable wall sections into their extended positions, and means for holding said wall sections in said depressed positions.

5. In a fruit sizer, the combination of: means for sizing fruit; a bin for receiving the sized fruit; a laterally inclined base over which sized fruit is adapted to roll from said sizing means into said bin; an endless conveyer extending along said base and adapted to convey fruit longitudinally when said fruit is held in contact therewith; a wall for engaging said sized fruit so as to retain it in contact with said conveyer, said wall being divided into sections, openings being provided in said base into which certain of said sections are adapted to be depressed to provide passageways through said wall; and means for holding said sections in either extended or depressed positions.

6. A combination as in claim 5 in which said lastmentioned means includes spring means for lifting said wall sections and manually operable latches for holding said sections in their depressed positions.

In testimony whereof, I have hereunto set my hand at Los Angeles, California, this 26th day of September, 1929.

DANA E. KEECH.